Patented July 4, 1939

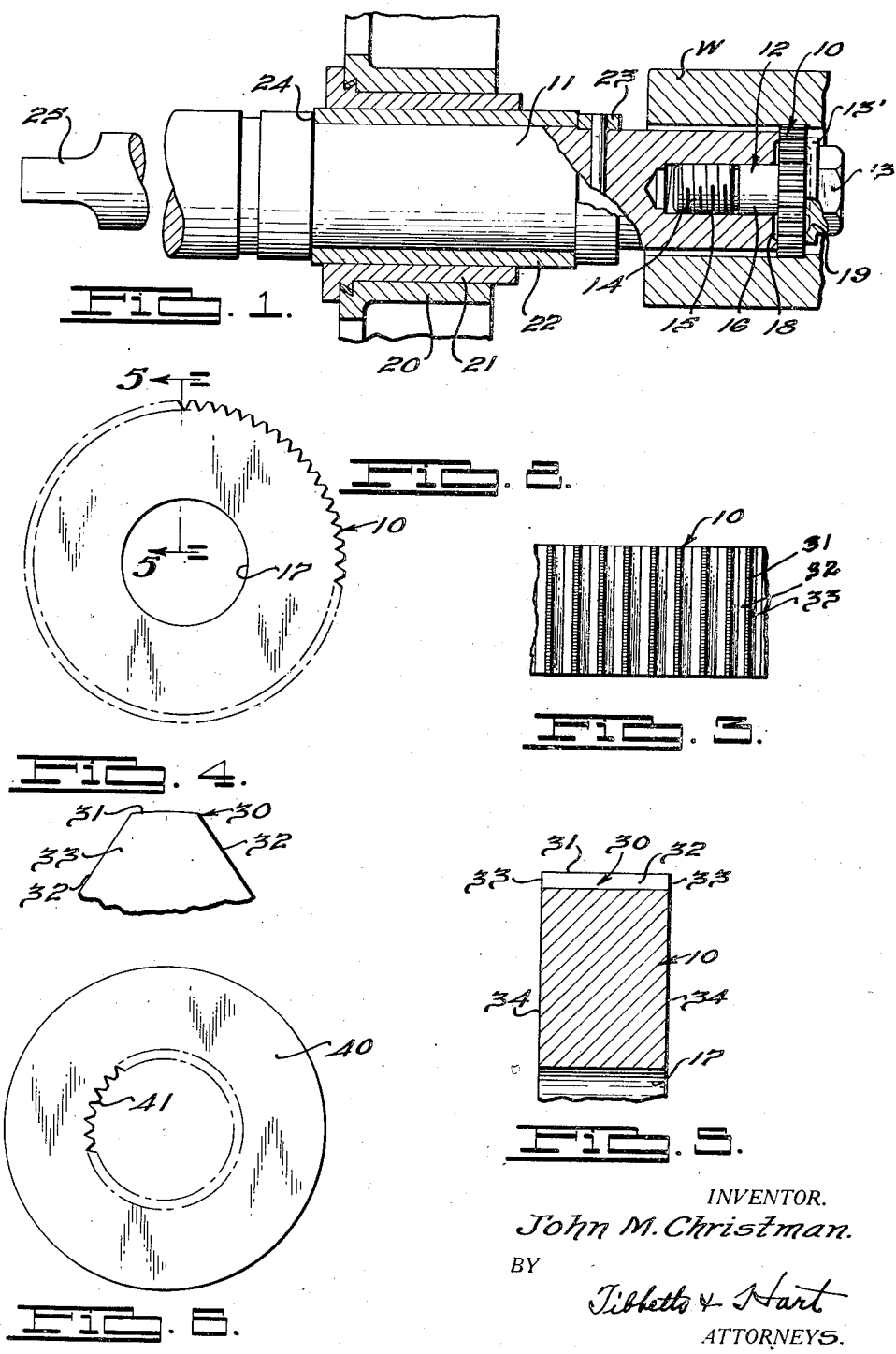

2,164,571

UNITED STATES PATENT OFFICE 2,164,571

CUTTING TOOL

John M. Christman, Detroit, Mich., assignor to Packard Motor Car Company, Detroit, Mich., a corporation of Michigan Application November 17, 1936, Serial No. 111,270

4 Claims. (Cl. 77—58)

This invention relates to cutting tools and more particularly to tools that are rotated and at the same time moved in an axial direction for a cutting operation.

My Patent No. 2,087,231, issued July 20, 1937, and my application Serial No. 110,827, filed November 14, 1936, are directed to the general type of cutters to which this invention relates. Such cutters or cutting members are generally in the form of an annulus having one circumference provided with similar teeth that extend the entire axial length thereof. The axial end faces of such annuluses are formed normal to the axis thereof and the opposite sides of the teeth are of different conformation. In order to make a given cutting operation with the same direction of tool feed, only one end of the teeth can be utilized, that is the tool is not reversible so that both ends of the teeth when rotated in a similar direction will give the same cutting result. This condition exists not only with the referred to tools but also with other tools used for similar purposes and operating under the same conditions.

It is an object of this invention to provide a cutting tool, of the character referred to, that can be reversed relative to the same driving mechanism to effect a similar cutting operation upon work.

Another object of the invention is to provide a tool, of the character referred to, with teeth formed to make the same cut on work when either toothed end thereof is placed in effective position on the same driving mechanism.

Still another object of the invention is to provide a tooth formation for cutting tools such that the cutting edges at either end can be rotated in clockwise or anti-clockwise direction to make substantially the same cut on the work.

Another object of the invention is to provide a cutting tool for forming a circumference that will make twice the number of cuts upon work as the tools previously employed.

Another object of the invention is to provide a tool, of the character referred to, that will make a fast cut on certain kinds of material at a low tool cost.

Other objects of the invention will appear from the following description taken in connection with the drawing, which forms a part of this specification, and in which:

Fig. 1 is a view, partly in section, of a rotary boring tool incorporating the invention, in cutting relation with a piece of work;

Fig. 2 is an enlarged side elevational view of the cutter shown in Fig. 1;

Fig. 3 is a fragmentary top view of the cutter shown in Fig. 2;

Fig. 4 is an enlarged end view of a portion of one of the cutter teeth shown in Fig. 2;

Fig. 5 is a fragmentary sectional view of the cutter taken on line 5—5 of Fig. 2;

Fig. 6 is a side elevational view of a modified form of the cutter.

One form of rotary cutting tool made in accordance with this invention is illustrated in Figs. 1 to 5 inclusive. The cutter member, preferably in the form of an annulus, is indicated generally at 10 and it is mounted upon a bar or support 11 as by a bolt 12, the bolt having a hexagonal head 13 and a threaded portion 14 operating in a threaded portion 15 of the support. The bolt 12 also has a smooth cylindrical portion 16 fitting closely in a similar portion of the support and extending through the cylindrical opening 17 in the cutter member 10. Thus the cutter 10 is centered upon and rigidly secured to the support 11.

The work upon which the tool is operating is indicated at W, and the tool is shown as reaming out stock around a hole already formed in the work.

A carrier 20 is provided for the support 11 and this carrier has a sleeve 21 in which is slidingly telescoped a sleeve 22 on the support 11. A pinned collar 23 retains the sleeve 22 on the support 11 against a shoulder 24. The support or bar 11 is formed at its opposite end with a driving shank 25 by means of which it may be rotated and moved endwise into and through the work.

The support 11 immediately back of the cutter 10 is preferably of a diameter such that its periphery extends around the base of the cutter teeth and thus provides as large a radius of contact with the cutter as possible for driving the cutter without keying it thereto. To insure full surface contact near its periphery, the cutter face of the bar 11 is slightly relieved as shown at 18. For the same purpose the bolt head 13 is undercut as at 19, and in order that clearance may be provided for the chips, which curl forward with the cutter, the bolt head 13 is smaller in diameter at its flange 13' than is the bar 11 on the other side of the cutter, and still smaller at the hex portion.

Any suitable means can be provided for fixing the cutter to the support but with this construction it will be seen that the cutter 10 is centered upon and adapted to be secured to the support by screwing the bolt 12 up tightly.

The cutter or cutting member 10 is in the form of an annulus which is preferably of a width several times less than its diameter. It may be thinner than this, depending largely upon how it is to be made, that is, whether by stamping it out of sheet metal or by forming it from a bar. The cutters may be made by boring a metal bar, cutting or rolling the teeth on the bar, and then cutting the individual annuluses from the bar. The particular form of cutter illustrated lends itself to the formation of teeth by a rolling operation which can be done at a comparatively low cost. The teeth may be evenly spaced or a slight unevenness may be effected to prevent chatter of the tool when engaging work.

The shape of the teeth of this cutter is best illustrated in Figs. 2 to 5 inclusive, and in Fig. 4, a tooth is shown greatly enlarged. In this form of the invention the teeth form the outer circumference of the annulus and they extend the entire width of the cutter, that is the entire axial length thereof. The teeth are preferably similar in conformation relatively and throughout their length.

The cutter teeth are indicated at 30 and their form is defined by the land 31, the sides 32 and the ends 33. The junctions formed by the ends and the sides of the teeth provide cutting edges for operation upon work. It is the formation of these cutitng edges that is of importance in this tool. In the present invention the ends of the teeth are ground normal to the axis of the annulus and at each axial end of the tool the ends of the teeth are in the same plane normal to the axis so that the cutting ends at each axial end of the tool press equally against the work when engaged therewith. The entire surface 34 at each axial end of the tool, including the teeth ends 33, is preferably ground in a plane normal to the axis of the annulus and this permits a single surface grinding operation in forming all of the cutting edges of the teeth.

The lands 31 of the teeth lie in a circle struck from the cutter axis on any cross section and these lands can be so ground while the tool is rotating on the annulus axis. When the cutting edges of the teeth become worn they can be relocated, that is reformed, by grinding the axial ends of the cutter normal to the tool axis and this reconditioning of the cutter can be done in the manner set forth in my previously mentioned application, Serial No. 68,589, Patent No. 2,087,231, issued July 20, 1937.

The form of tooth illustrated is preferably short in the radial direction and the teeth are close together circumferentially in order to adapt the cutter for fast operation. The circumferential dimension of each tooth is considerably less than the corresponding base dimension and the increase is gradual from the land to the base of the tooth. As shown, the sides 32 of each tooth are of similar conformation and while this is not essential to this invention still it is desirable. By so forming the sides of the teeth, the cutting edges at each end are similar thus allowing the cutter to be reversed axially in its relation to the driving bar without changing the position or relation of the cutting edges to the work being operated upon. A similar cut can therefore be taken when either axial end of the cutter is driven to engage the work and a uniform cutting action is obtained. It will thus be seen that the cutter will have twice the life of a cutter having only one axial end which can be utilized. Further than this, the tool can be rotated in a clockwise or anti-clockwise direction with either axial end clamped to the driving mechanism in cutting position to make the same cut upon a piece of work.

It is not essential to this invention that the sides of each tooth be of similar conformation but it is required if the same kind of a cut is to be made when both ends of the tool teeth are to be utilized for a similar cutting operation when the tool is driven in the same direction. Otherwise there will be a difference in the cutting edges presented.

It is sometimes desirable to form the sides of the teeth so that they have a different conformation for the purpose of selectively making two different kinds of cuts. It is essential however that the circumferential dimension of the teeth shall increase from the land to the base in order to provide the necessary strength to insure ruggedness sufficient for commercial operation upon work. We thus see that the sides of the tooth whether they are similar or different in conformation must diverge from the land toward the base, and that the corresponding sides of each tooth should be substantially similar in conformation.

This form of cutter is particularly adapted for reaming operations and due to the short radial length of the tooth and the conformation of the sides of its teeth it is particularly adapted for fast reaming operation. The herein described cutter can have teeth of a longer radial length and still have the advantages of reversibility and similarity of cutting performance whereby its usefulness is materially increased over reamers heretofore used.

In Fig. 6 I have illustrated a modified form of cutter made in accordance with this invention. This cutter is in the form of an annulus 40 having the axial ends finished normal to the axis in a manner above described and differs from the described preferred form of the invention only in that the teeth 41 define the inner circumference rather than the outer circumference of the annulus. These teeth 41 extend the entire width of the annulus and are of a similar general cross section throughout their length as the teeth previously described. This form of cutter is useful in cutting stock to a desired diameter and further details of the driving mechanism therefor and of this type of cutter can be found in my above mentioned application, Serial No. 110,827.

The cutters herein described can be manufactured at a relatively low cost and without decreasing their efficiency. Their life will be at least twice that of similar tools now in use before relocation of cutting edges is required.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. A rotary boring tool comprising a substantially cylindrical disk having similar teeth formed across its peripheral face, the sides of said teeth diverging at similar angles from the land toward the base, and the cutting ends of said teeth at both sides of the disk being disposed in planes normal to the cutter axis and formed without relief.

2. A rotary cutting tool for finishing a cylindrical surface to the effective diameter of the tool by relative axial displacement of the tool and work, comprising a disk having an opening therethrough, thereby providing internal and external surfaces, one of said surfaces having flutes forming similar teeth spaced thereabout each having the sides diverging at a substantially similar angle from the land toward the base, said teeth being formed at their ends with flat surfaces coplanar with the ends of the disk, the junctions of the sides of the teeth forming cutting edges without relief.

3. In a rotary boring tool comprising a flat circular metal disk having parallel faces and having its periphery formed by alternate teeth and flutes, the leading end of each of said teeth being a flat surface coplanar with the corresponding face of said disk, and each tooth having similar angularly extending sides diverging toward the base and forming coplanar unrelieved cutting edges at their junction with the flat end surfaces.

4. A rotary boring tool comprising a metal disk having peripheral teeth extending longitudinally of the axis and each formed with their sides angling in a diverging relation toward the base, said disk having on its leading end a surface wholly in one plane to form unrelieved coplanar cutting edges at the junctions with the sides of the teeth.

JOHN M. CHRISTMAN.